US010217076B2

(12) United States Patent
Duquene et al.

(10) Patent No.: US 10,217,076 B2
(45) Date of Patent: Feb. 26, 2019

(54) AUTOMATICALLY CACHING AND SENDING ELECTRONIC SIGNATURES

(71) Applicant: International Business Machines Corporation, Armonk, NY (US)

(72) Inventors: Joel Duquene, Raleigh, NC (US); Morris S. Johnson, Jr., Cary, NC (US); Shelton M. Jones, II, Durham, NC (US); Adrienne Y. Miller, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/712,308

(22) Filed: Sep. 22, 2017

(65) Prior Publication Data

US 2018/0247253 A1 Aug. 30, 2018

Related U.S. Application Data

(63) Continuation of application No. 15/442,804, filed on Feb. 27, 2017.

(51) Int. Cl.
*H04L 9/32* (2006.01)
*G06Q 10/08* (2012.01)

(52) U.S. Cl.
CPC ......... *G06Q 10/083* (2013.01); *H04L 9/3247* (2013.01); *G06F 2221/2111* (2013.01)

(58) Field of Classification Search
CPC ............... G06Q 10/083; H04L 9/3247; G06F 2221/2111
See application file for complete search history.

(56) References Cited

U.S. PATENT DOCUMENTS 6,404,337 B1 * 6/2002 Van Till ............... A47G 29/141
340/568.1
6,434,158 B1 * 8/2002 Harris .................... G06Q 20/40
370/401
7,248,160 B2 * 7/2007 Mangan .................. G06Q 10/08
340/539.13

(Continued)

OTHER PUBLICATIONS

"How do you handle daytime deliveries?", ask.metafilter.com, Mar. 16, 2016, all pages. (Year: 2016).*

(Continued)

*Primary Examiner* — Kevin H Flynn
*Assistant Examiner* — Omar Zeroual
(74) *Attorney, Agent, or Firm* — William H. Hartwell (57) ABSTRACT

In one embodiment, a method for automatically caching and sending electronic signatures is provided. The method includes storing, by a mobile device, a digital signature, wherein the digital signature is associated with information relating to an expected delivery at an expected location, and wherein the mobile device is located within a proximity of the expected location. The method further includes detecting, by the mobile device, that a delivery service has arrived at the expected location with a package. The method further includes, in response to determining, by the mobile device, that the package corresponds to the expected delivery, authorizing, by the mobile device, the package to be left at the expected location by transmitting the digital signature to a delivery device associated with the delivery service.

1 Claim, 5 Drawing Sheets

(56) References Cited

U.S. PATENT DOCUMENTS

| | | | |
|---|---|---|---|
| 7,528,722 B2 | 5/2009 | Nelson | |
| 7,581,105 B2* | 8/2009 | Dietl | G06F 21/64 |
| | | | 713/176 |
| 7,650,295 B2 | 1/2010 | Matsumoto | |
| 8,441,367 B1* | 5/2013 | Lee | G08B 21/18 |
| | | | 340/539.13 |
| 8,473,326 B1* | 6/2013 | Griffith | G06Q 30/0203 |
| | | | 701/410 |
| 8,898,083 B2 | 11/2014 | Skaaksrud et al. | |
| 9,300,581 B1* | 3/2016 | Hui | H04L 45/74 |
| 9,741,010 B1* | 8/2017 | Heinla | G06Q 10/083 |
| 2001/0054025 A1* | 12/2001 | Adams, II | G06Q 10/08 |
| | | | 705/50 |
| 2002/0016726 A1* | 2/2002 | Ross | G06Q 10/08 |
| | | | 705/339 |
| 2002/0113703 A1* | 8/2002 | Moskowitz | A47G 29/141 |
| | | | 340/568.1 |
| 2005/0218220 A1* | 10/2005 | Silver | G06Q 10/08 |
| | | | 235/384 |
| 2005/0289008 A1* | 12/2005 | Olivier | G06Q 10/08 |
| | | | 705/22 |
| 2006/0138223 A1* | 6/2006 | Schar | G06Q 10/08 |
| | | | 235/384 |
| 2007/0078797 A1* | 4/2007 | Won | G06Q 10/08 |
| | | | 705/408 |
| 2007/0080204 A1* | 4/2007 | Mulcahy | G06Q 10/08 |
| | | | 235/375 |
| 2007/0193834 A1* | 8/2007 | Pai | G06Q 10/08 |
| | | | 186/3 |
| 2008/0147423 A1* | 6/2008 | Braun | G06F 21/606 |
| | | | 705/1.1 |
| 2009/0157420 A1* | 6/2009 | Lou | B07C 3/12 |
| | | | 705/1.1 |
| 2009/0261949 A1* | 10/2009 | Hara | G06K 7/0008 |
| | | | 340/10.1 |
| 2010/0131769 A1* | 5/2010 | Homma | G06Q 10/08 |
| | | | 713/176 |
| 2012/0246077 A1* | 9/2012 | Skaaksrud | G06Q 30/0615 |
| | | | 705/50 |
| 2012/0303542 A1* | 11/2012 | Marcus | G06Q 10/08 |
| | | | 705/330 |
| 2013/0066744 A1* | 3/2013 | Higgins | G06Q 10/0833 |
| | | | 705/26.41 |
| 2013/0070928 A1* | 3/2013 | Ellis | H04R 25/30 |
| | | | 381/56 |
| 2013/0151434 A1* | 6/2013 | Chandaria | G06Q 10/08 |
| | | | 705/333 |
| 2013/0297435 A1* | 11/2013 | Prellwitz | G06Q 30/0635 |
| | | | 705/22 |
| 2014/0149308 A1* | 5/2014 | Ming | G06Q 10/0833 |
| | | | 705/333 |
| 2014/0330629 A1* | 11/2014 | Beadles | G06Q 30/0207 |
| | | | 705/14.26 |
| 2015/0081583 A1* | 3/2015 | Butler | G06Q 10/0833 |
| | | | 705/333 |
| 2015/0120529 A1* | 4/2015 | Faaborg | G06Q 10/083 |
| | | | 705/39 |
| 2015/0142594 A1* | 5/2015 | Lutnick | G06Q 20/202 |
| | | | 705/21 |
| 2015/0145643 A1* | 5/2015 | Fadell | G06Q 10/083 |
| | | | 340/5.51 |
| 2015/0199643 A1* | 7/2015 | Hubner | G06Q 10/0833 |
| | | | 705/333 |
| 2015/0234806 A1* | 8/2015 | Bhagwan | G06F 17/2765 |
| | | | 705/7.18 |
| 2016/0012392 A1* | 1/2016 | Paden | G06Q 10/0838 |
| | | | 705/341 |
| 2016/0063438 A1* | 3/2016 | Shuken | G06Q 10/08355 |
| | | | 705/338 |
| 2016/0247344 A1* | 8/2016 | Eichenblatt | A47G 29/141 |
| 2016/0307380 A1* | 10/2016 | Ho | G07C 9/00079 |
| 2016/0379157 A1 | 12/2016 | Nassar et al. | |
| 2017/0019399 A1* | 1/2017 | Yamazaki | H04L 63/0853 |
| 2017/0053232 A1* | 2/2017 | Wilkinson | G07C 9/0015 |
| 2017/0061372 A1* | 3/2017 | Agarwal | G06Q 10/0835 |
| 2017/0124510 A1* | 5/2017 | Caterino | G07C 9/00896 |
| 2017/0132565 A1* | 5/2017 | Beadles | G06K 7/10297 |
| 2017/0154638 A1* | 6/2017 | Hwang | G06K 9/00711 |
| 2017/0272249 A1* | 9/2017 | Bhandarkar | G06F 21/64 |
| 2017/0293883 A1* | 10/2017 | Li | G06Q 10/0832 |
| 2017/0316718 A1* | 11/2017 | Hughes | G09B 21/009 |
| 2017/0323259 A1* | 11/2017 | Gillen | G06Q 10/0833 |
| 2017/0323545 A1* | 11/2017 | Gillen | G06Q 10/083 |
| 2018/0005184 A1* | 1/2018 | Schenken | G06Q 10/02 |
| 2018/0005495 A1* | 1/2018 | Hieb | G08B 5/228 |
| 2018/0108191 A9* | 4/2018 | Ho | G07C 9/00079 |
| 2018/0139332 A1* | 5/2018 | Kerzner | G08B 13/19645 |
| 2018/0151013 A1* | 5/2018 | Carstens | A47G 29/141 |
| 2018/0165631 A1* | 6/2018 | Romero | G06Q 10/0833 |

OTHER PUBLICATIONS

"Docusign Product Features" Sep. 8, 2016, Internet Archive WayBack Machine, 12 pages, <https://web.archive.org/web/20160908133549/https://www.docusign.com/features-and-benefits/features>.

"I work during the day. How do I authorize packages to be left at my address?", Dec. 6, 2016, Internet Archive Wayback Machine, 2 pages, <https://web.archive.org/web/20161206004049/https://www.ups.com/content/us/en/resources/sri/leave-at-my-address.html>.

Duquene et al., "Automatically Caching and Sending Electronic Signatures", U.S. Appl. No. 15/442,804, filed Feb. 27, 2017, 43 pages.

IBM, Appendix P, List of IBM Patents or Patent Applications Treated as Related, dated Sep. 22, 2017, 2 pages.

* cited by examiner

AUTOMATICALLY CACHING AND SENDING ELECTRONIC SIGNATURES

BACKGROUND

The present invention relates generally to the field of electronic signatures, and more particularly to storing and emitting an electronic signature.

An electronic signature, also referred to as an e-signature, refers to data in electronic form, that is used by a person to sign his or her name, and generally provides the same legal standing as a handwritten signature. Electronic signatures are increasingly used in e-commerce and in regulatory filings to implement signatures in a cryptographically protected way. An electronic signature is generally intended to provide a secure and accurate identification method for a signatory (i.e., person that is signing), to provide a seamless transaction.

A package delivery, also referred to as a parcel delivery, is the delivery of shipping containers, parcels, or high value mail as single shipments. Package delivery services are typically provided by postal systems, express mail providers, private package delivery services, and less than truckload (LTL) shipping carriers.

SUMMARY

Embodiments of the present invention disclose a method, computer program product, and system for automatically caching and sending electronic signatures. The method includes storing, in a mobile device, a digital signature, wherein the digital signature is associated with information relating to an expected delivery at an expected location, and wherein the mobile device is located within a proximity of the expected location. The method further includes detecting, in the mobile device, that a delivery service has arrived at the expected location with a package. The method further includes, in response to determining, in the mobile device, that the package corresponds to the expected delivery, authorizing, in the mobile device, the package to be left at the expected location by transmitting the digital signature to a delivery device associated with the delivery service.

DETAILED DESCRIPTION

Embodiments in accordance with the present invention recognize that package deliveries do not always arrive at an expected time, which can be a problem when a signature is required by a shipping party or a delivery service. For example, a person, also referred to as an intended recipient, who is expecting an important package that requires a signature upon delivery, may be unable to come to the door due to attending to a child with the flu. In another example, a person could be cleaning and operating a noisy vacuum and not hear a doorbell. In both of the previous examples, the person can miss the expected delivery due to being occupied for a short period of time. A method is needed to provide an electronic, also referred to as a digital, signature for a short period of time, or on-demand, when the receiver (e.g., the person expecting the package) is not able to come to the door and manually sign for the delivery.

One solution to this problem would be to have the shipping company, also referred as a delivery service, take the package to an alternate location such as a neighbor's house. However, this method depends on previous instructions to be made with the delivery service instructing the delivery person to take the package to the alternate location. The neighbor at the alternate location is also required to be home and the same situations previously described could cause the neighbor to temporarily be unable to answer the door. Another solution would be to wait until a next day to hopefully be able to answer the door when the delivery service arrives. However, this is not optimal when the expected package is important. Another solution would be to have the shipping company hold the package at a distribution center and have the recipient arrive at the distribution center at a later time to pick the package up. However, this solution negates advantages of using a shipping company. Another solution would be to leave a note on the door for the delivery service that includes a signature and instructions to leave the package by the door. However, this solution discloses to others that a recipient is not home/available and can be unsafe.

Embodiments of the present invention disclose a system that stores an electronic signature on a device, and emits the signature to a delivery service device when a party receiving a package is not able to physically sign or otherwise be near a delivery location, such as a front door. The signature is only emitted when the user is not near the door and when the door bell and/or door knock is heard, and/or when a security camera determines the shipper is at the front door. The signature may be unique to a specific shipper, package (e.g., tracking number), or time period.

Figure 1:
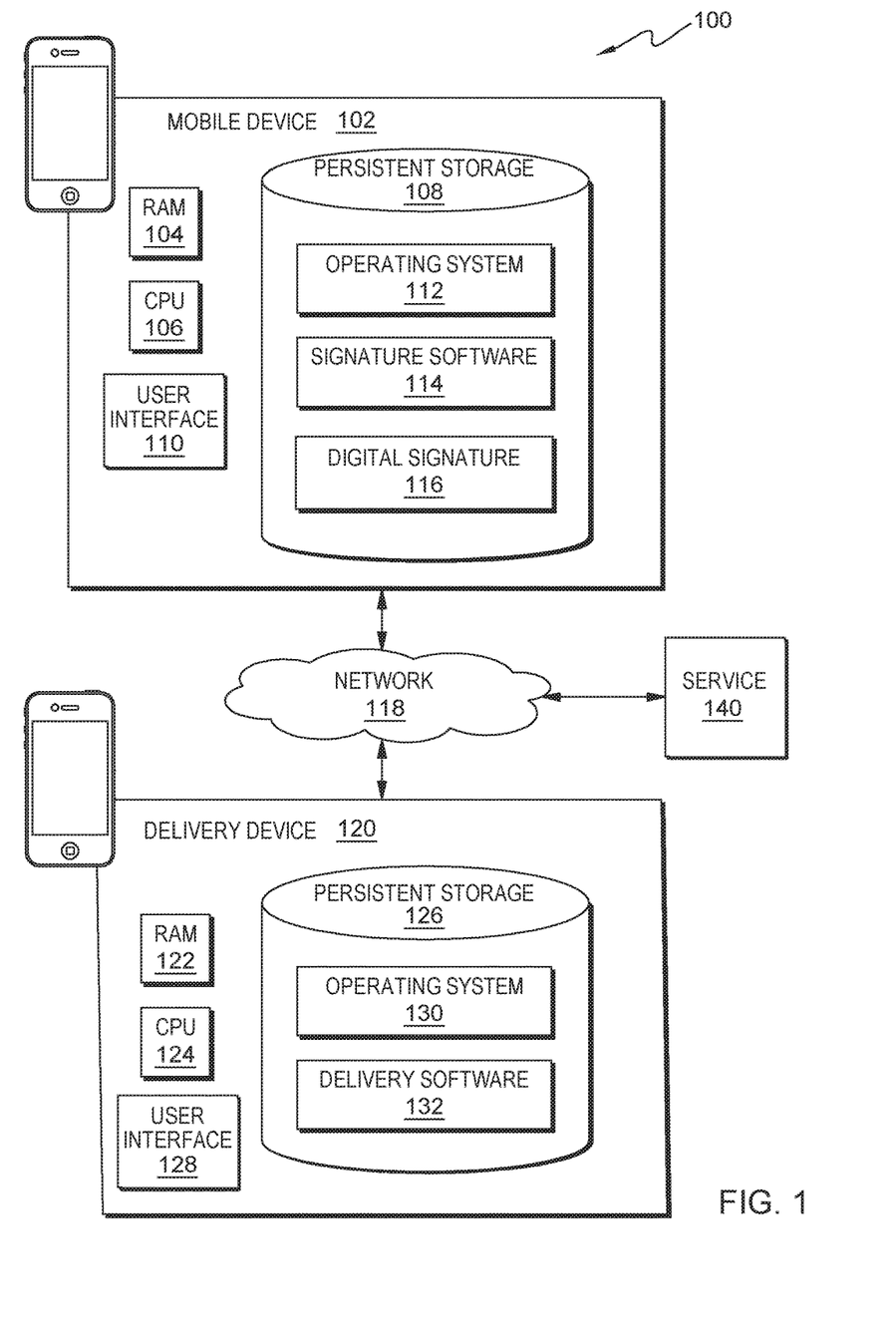
FIG. 1 is a functional block diagram illustrating a digital signature processing environment, in an embodiment in accordance with the present invention.

Embodiments in accordance with the present invention will now be described in detail with reference to the Figures. FIG. 1 is a functional block diagram, generally designated 100, illustrating a digital signature processing environment, in an embodiment in accordance with the present invention.

Digital signature processing environment 100 includes mobile device 102, delivery device 120, service 140 and other computing devices (not shown), all interconnected over network 118. Mobile device 102 includes random access memory (RAM) 104, central processing unit (CPU) 106, persistent storage 108, and user interface 110. Mobile device 102 may be a Web server, or any other electronic device or computing system, capable of processing program instructions and receiving and sending data. In some embodiments, mobile device 102 may be a laptop computer, a tablet computer, a netbook computer, a personal computer (PC), a desktop computer, a personal digital assistant (PDA), a smart phone, or any programmable electronic device capable of communicating over a data connection to network 118. In other embodiments, mobile device 102 may represent server computing systems utilizing multiple computers as a server system, such as in a distributed computing environment. In general, mobile device 102 is representative of any electronic device or combinations of electronic devices capable of executing machine-readable program instructions and communicating with delivery device 120 via network 118 and with various components and devices (not shown) within digital signature processing environment 100.

Mobile device 102 includes persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information.

Operating system 112, signature software 114, and digital signature 116 are stored in persistent storage 108, which also includes software (not shown) that enables mobile device 102 to communicate with delivery device 120, service 140, and other computing devices (not shown) of digital signature processing environment 100 over a data connection on network 118. In other example embodiments, signature software 114 may be a component of operating system 112.

Signature software 114 is a computer program, or set of computer programs, that enables a user to store a digital signature (e.g., digital signature 116) for a package, on mobile device 102, and at a later time, emit the digital signature to a delivery service device (e.g., delivery device 120), when the user receiving the package is not able to physically sign or otherwise be near the door. Additionally, prior to storing the digital signature for the package, signature software can query a user's email, calendar, and/or text messages to determine one or more shipping confirmations and record a tracking number, a delivery service, an expected arrival date, and whether signature is required for the package.

Digital signature 116 is a hand written signature belonging to a user of mobile device 102. For example, the user of mobile device 102 can write a signature on a paper, then scan the signature using a scan feature (not shown) of mobile device 102. In another example embodiment, the user can use user interface 110 to manually write a signature. For example, the user of mobile device 102 can write a signature on user interface 110 using a finger. In another example, the user of mobile device 102 can write a signature on user interface 110 using a stylus, also referred to as a stylus pen. In computing, a stylus is a small pen-shaped instrument that is used to input commands to a computer screen, mobile device or graphics tablet. When using touchscreen devices, a user places a stylus on the surface of the screen to draw or make selections by tapping the stylus on the screen. In another example embodiment, the user of mobile device 102 can type a signature using a format such as an S-signature format. An S-signature is a signature inserted between forward slash marks, but not a handwritten signature (e.g., /John Doe/). In other example embodiments, the user can create a digital signature using pen computing techniques that utilize a mouse or trackpad pointing devices on a computing device within digital signature processing environment 100.

In one example embodiment, signature software 114 can utilize a mathematical algorithm, such as public key infrastructure (PKI), when generating digital signature 116. PKI is a set of roles, policies, and procedures needed to create, manage, distribute, use, store, and revoke digital certificates and manage public-key encryption. When creating digital signature 116 for a user of mobile device 102, signature software 114 generates digital signature 116 using a private key, which is securely stored in persistent storage 108. The mathematical algorithm acts as a cipher, creating data matching the users hand written signature, called a hash, and then encrypts the data. The resulting encrypted data is digital signature 116. Digital signature 116 is also marked, or tagged, with the time that the signature was created. If any portion of the data changes at any time after being created, digital signature 116 is invalidated. In other example embodiments, digital signature 116 can be stored using service 140.

Mobile device 102 also includes user interface 110. User interface 110 is a program that provides an interface between a user of mobile device 102 and a plurality of applications that may reside in mobile device 102 (e.g., signature software 114), and/or applications on computing devices that may be accessed over a data connection on network 118. A user interface, such as user interface 110, refers to the information (e.g., graphic, text, sound) that a program presents to a user and the control sequences the user employs to control the program. User interface 110 is a type of interface that allows users to interact with peripheral devices (i.e., external computer hardware that provides input and output for a computing device, such as a keyboard and mouse, or touch control) through graphical icons and visual indicators as opposed to text-based interfaces, typed command labels, or text navigation. The actions in graphical user interfaces (GUIs) are often performed through direct manipulation of the graphical elements. A variety of types of user interfaces exist. In one embodiment, user interface 110 is a GUI. In another embodiment, user interface 110 may be a web user interface (WUI) and can display text, documents, web browser windows, user options, application interfaces, and instructions for operation, and includes the information (such as graphic, text, and sound) that a program presents to a user and the control sequences the user employs to control the program. User interface 110 may also be mobile application software that provides an interface between a user of mobile device 102, delivery device 120, service 140, and other devices (not shown), over a data connection on network 118. Mobile application software, or an "app," is a computer program designed to run on smart phones, tablet computers and other mobile devices. User interface 110 enables a user of mobile device 102, and signature software 114, to capture, and/or receive, hand written signatures.

Figure 5:
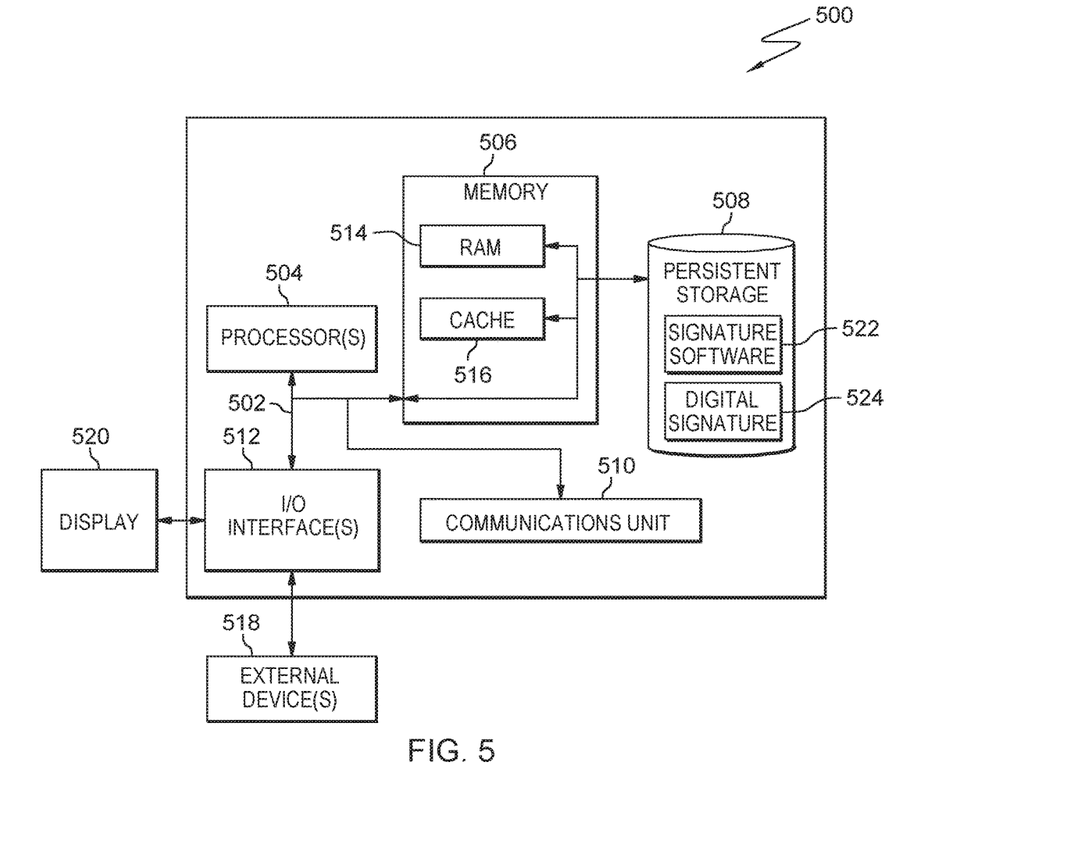
FIG. 5 depicts a block diagram of components of the mobile device executing the signature software, in an embodiment in accordance with the present invention.

Mobile device 102 may include internal and external hardware components, as depicted and described in further detail with respect to FIG. 5.

In FIG. 1, network 118 is shown as the interconnecting fabric between mobile device 102, delivery device 120, service 140, and with various components and devices (not shown) within digital signature processing environment 100. In practice, the connection may be any viable data transport network, such as, for example, a LAN or WAN. Network 118 can be for example, a local area network (LAN), a wide area network (WAN) such as the Internet, or a combination of the two, and include wired, wireless, or fiber optic connections. In general, network 118 can be any combination of connections and protocols that will support communications between mobile device 102, delivery device 120, and with various components and devices (not shown) within digital signature processing environment 100.

Delivery device 120 is also included in digital signature processing environment 100. Delivery device 120 includes random access memory (RAM) 122, central processing unit (CPU) 124, persistent storage 126, and user interface 128. Delivery device 120 may be a Web server, or any other electronic device or computing system, capable of processing program instructions and receiving and sending data. In some embodiments, delivery device 120 may be a laptop computer, a tablet computer, a netbook computer, a personal computer (PC), a desktop computer, a personal digital assistant (PDA), a smart phone, or any programmable electronic device capable of communicating over a data connection to network 118. In other embodiments, delivery device 120 may represent server computing systems utilizing multiple computers as a server system, such as in a distributed computing environment. In general, delivery device 120 is representative of any electronic devices or combinations of electronic devices capable of executing machine-readable program instructions and communicating with mobile device 102 via network 118 and with various components and devices (not shown) within digital signature processing environment 100.

Delivery device 120 includes persistent storage 126. Persistent storage 126 may, for example, be a hard disk drive. Alternatively, or in addition to a magnetic hard disk drive, persistent storage 126 may include a solid state hard drive, a semiconductor storage device, read-only memory (ROM), erasable programmable read-only memory (EPROM), flash memory, or any other computer-readable storage medium that is capable of storing program instructions or digital information.

Operating system 130 and delivery software 132 are stored in persistent storage 126, which also includes software (not shown) that enables delivery software 132 to communicate with mobile device 102, service 140, and other computing devices (not shown) of digital signature processing environment 100 over a data connection on network 118. In other example embodiments, delivery software 132 may be a component of operating system 130.

Delivery device 120 also includes user interface 128. User interface 128 is a program that provides an interface between a user of delivery device 120 and a plurality of applications that may reside in delivery device 120 (e.g., delivery software 132), and/or applications on computing devices that may be accessed over a data connection on network 118. User interface 128 enables a user of delivery device 120, and delivery software 132, to receive digital signature 116 and other instructions pertaining to a delivered package.

Service 140 is also included in digital signature processing environment 100. In one example embodiment, service 140 is a cloud service capable of monitoring deliveries. Service 140 can store one or more digital signatures (e.g., digital signature 116), relating to a plurality of subscribed clients, wherein service 140 can track a shipment and transmit digital signature 116 upon detecting a delivery service presence at a residence. In another example embodiment, service 140 can determine that a delivery service has arrived via a smart doorbell. Service 140 can receive a signal from delivery device 120 relating a package. Upon determining that the received signal identifies a stored digital signature stored at service 140, service 140 can transmit the stored digital signature, such as digital signature 116, to delivery device 120.

Figure 2:
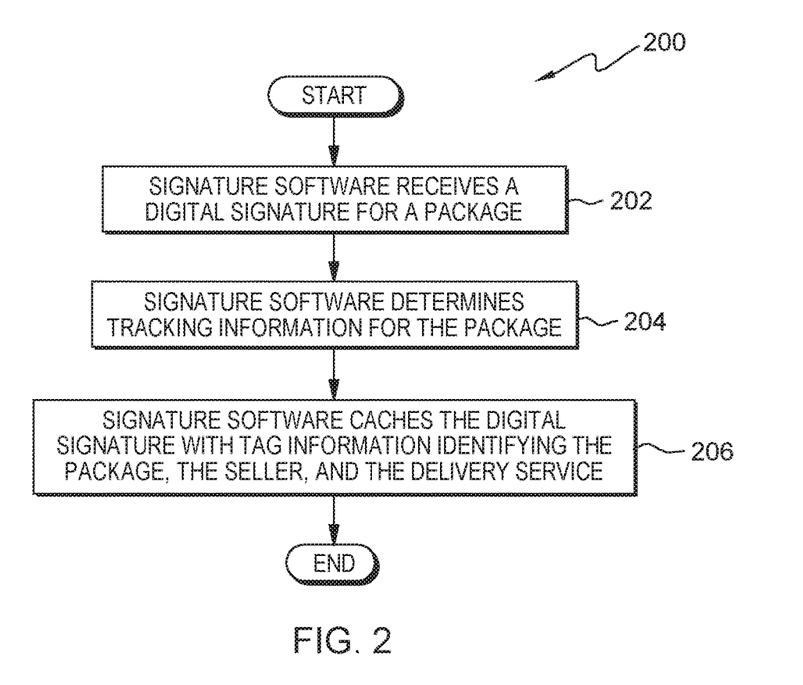
FIG. 2 is a flowchart depicting operational steps of a signature software, on a mobile device within the digital signature processing environment of FIG. 1, for determining a tracking information and caching a digital signature for a package, in an embodiment in accordance with the present invention.

FIG. 2 is a flowchart, generally designated 200, depicting operational steps of a signature software, on a mobile device within the digital signature processing environment of FIG. 1, for determining a tracking information and caching a digital signature for a package, in an embodiment in accordance with the present invention. In an example embodiment, a user stores a digital signature (e.g., digital signature 116), on mobile device 102 using signature software 114. In one example embodiment, the user of mobile device 102 can scan a signature using a scan feature (not shown) of mobile device 102. In another example embodiment, the user can use user interface 110. For example, the user of mobile device 102 can write a signature on user interface 110 using a finger. In another example, the user of mobile device 102 can write a signature on user interface 110 using a stylus, also referred to as a stylus pen. In other example embodiments, the user can create a digital signature using pen computing techniques that utilize a mouse or trackpad pointing devices on a computing device within digital signature processing environment 100. In still other example embodiments, the user can create a digital signature using a digital keyboard on mobile device 102.

Signature software 114 receives a digital signature for a package as depicted in step 202. For example, a user of mobile device 102, using signature software 114, can creating digital signature 116 by signing a signature on user interface 110. In another example embodiment, the user of mobile device 102 can use signature software 114 to scan in a signature. In other example embodiments, signature software 114 can receive digital signature 116 via a text message, email, and/or any electronic communication between mobile device 102 and one or more computing devices within digital signature processing environment 100.

In step 204, signature software 114 determines tracking information for the package. For example, signature software 114 can determine information relating to the package, such as a tracking number, an order number, an invoice for the order, the merchant or seller, a time of purchase, the delivery company and/or an expected date for the delivery. Signature software 114 can determine information relating to the package by querying one or more text messages, wherein the one or more text messages are confirmation text messages relating to a recent purchase. Signature software 114 can determine information relating to the package by monitoring one or more email accounts or calendars configured on mobile device 102, or on one or more computing devices within digital signature processing environment 100, wherein the one or more email accounts or calendars configured on mobile device 102 contain information relating to the package. Stated another way, signature software 114 can monitor text messages, email accounts, and/or calendars to determine a plurality of information relating to a package delivery.

Signature software 114 caches the digital signature with tag information identifying the package, the seller, and the delivery service as depicted in step 206. For example, upon creating digital signature 116 using the previously described methods, signature software 114 tags digital signature 116 with tag information relating to the package such as a tracking number, an order number, an invoice for the order, the merchant or seller, a time of purchase, the delivery company and/or an expected date for the delivery. Signature software 114 then stores digital signature 116 in persistent storage 108 to be used at a later time. In another example embodiment, signature software 114 can store digital signature 116 at service 140 with tag information relating to the package such as a tracking number, an order number, an invoice for the order, the merchant or seller, a time of purchase, the delivery company and/or an expected date for the delivery.

Figure 3:
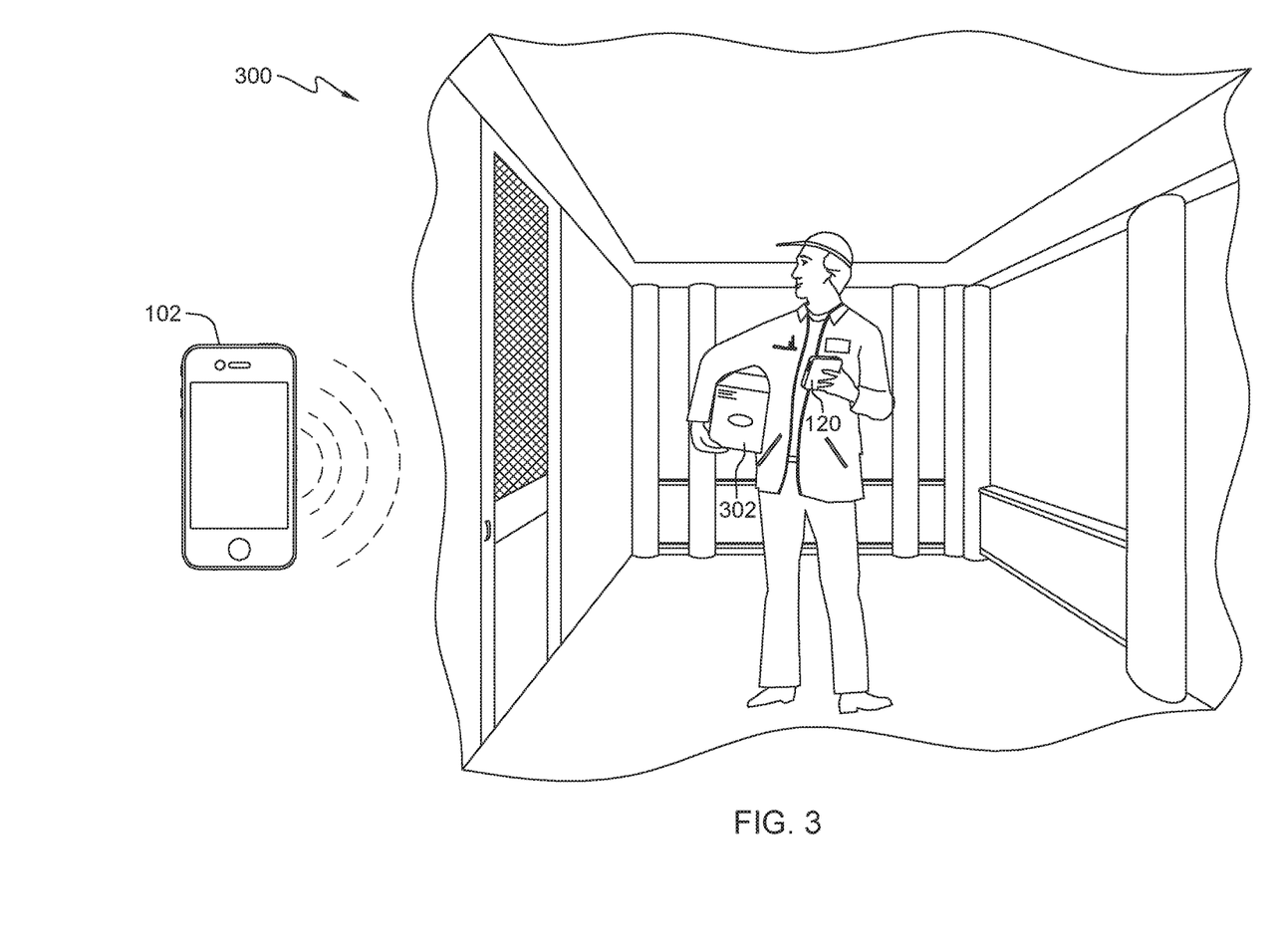
FIG. 3 is an illustration of a signature software, executing on a mobile device within the digital signature processing environment of FIG. 1, for transmitting a digital signature to a delivery service for a package, in an embodiment in accordance with the present invention.
Figure 4:
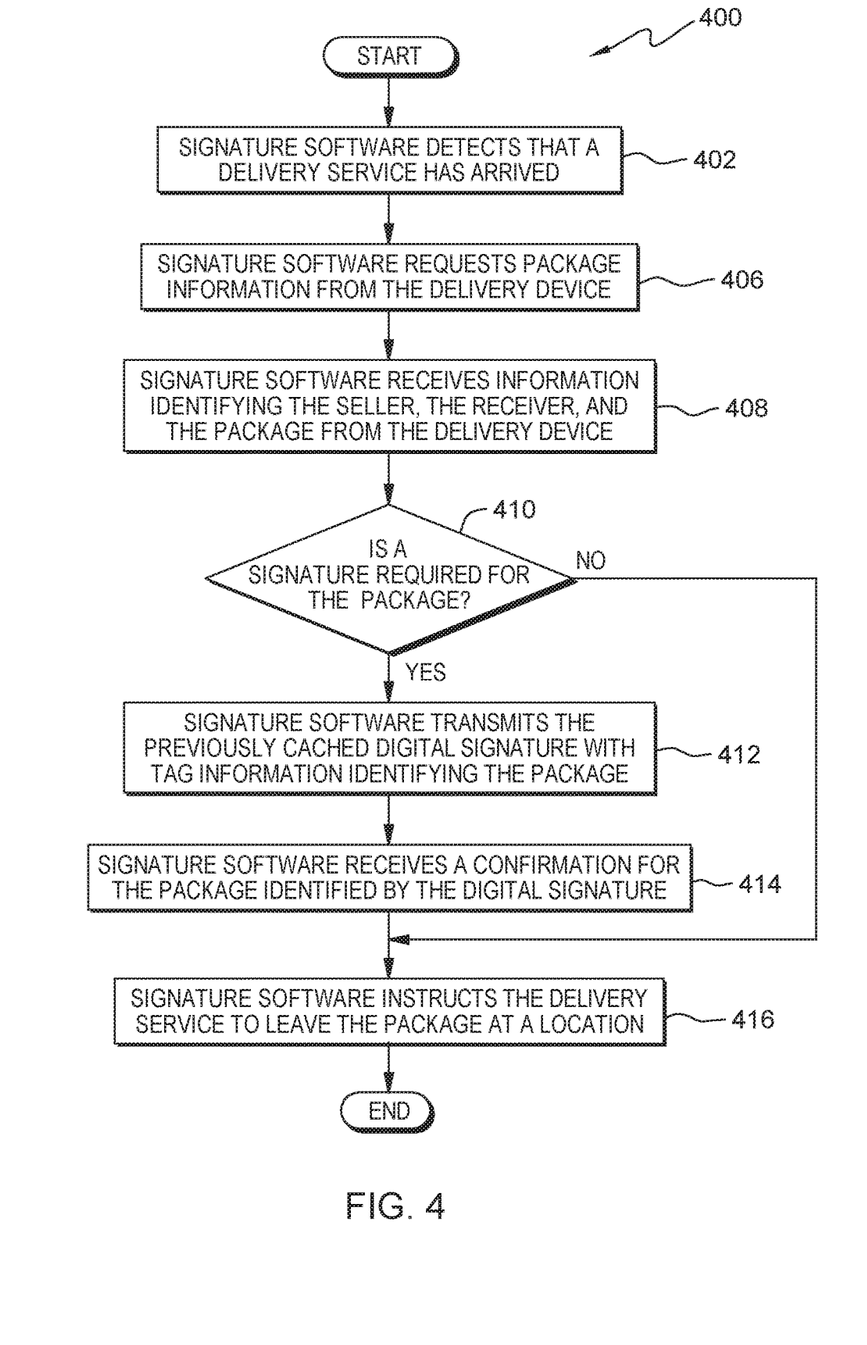
FIG. 4 is a flowchart depicting operational steps of a signature software, on a mobile device within the digital signature processing environment of FIG. 1, for transmitting a cached digital signature to a delivery service for a package, in an embodiment in accordance with the present invention.

FIG. 3 is an illustration, generally designated 300, of a signature software, executing on a mobile device within the digital signature processing environment of FIG. 1, for transmitting a digital signature to a delivery service for a package, in an embodiment in accordance with the present invention. FIG. 4 is a flowchart, generally designated 400, depicting operational steps of signature software, on a mobile device within the digital signature processing environment of FIG. 1, for transmitting a cached digital signature to a delivery service for a package, in an embodiment in accordance with the present invention. The elements of FIG. 3 and the operational steps of FIG. 4 will now be discussed over the course of the following paragraphs.

In an example embodiment, signature software 114 detects a delivery service has arrived at an expected delivery location as depicted in step 402 of FIG. 4. For example, a user of mobile device 102 cannot answer the door (i.e. the expected delivery location) and leaves mobile device 102 near (i.e. within a proximity of) the door to transmit digital signature 116 when the delivery service arrives with package 302 as depicted in FIG. 3. In this example, "within a proximity" of the door means that mobile device 102 is within communications range of the door (or an object, such as delivery device 120, located outside of the door). Signature software 114 can detect the delivery service arrival by: (i) detecting the sound emitted by a doorbell and/or a knocking sound on the door, (ii) receiving an indication from a smart doorbell (not shown) that the delivery service has arrived, (iii) receiving a transmission from delivery device 120, (iv) receiving a cloud notification from service 140 (e.g., if the shipping service has an online tracking system), and/or (v) receiving an indication from a video camera (e.g., one or more security cameras) and machine vision to determine that a package is being delivered.

In step 406, signature software 114 requests package information from the delivery device. For example, signature software 114 can transmit a request for package information. In one example embodiment, the transmitted request can be instructions that request delivery device 120 to transmit any package information destined for the owner of mobile device 102. Stated another way, signature software 114 asks delivery device 120 for any package information. In another example embodiment, the transmitted request can be instructions that request delivery device 120 to transmit package information for two or more expected packages. For example, signature software 114 can transmit a request for information relating to two or more expected packages. The transmitted request can include information identifying the two or more expected packages such as a tracking number, an order number, an invoice for the order, the merchant or seller, an expected receiver, a time of purchase, the delivery company and/or an expected date for the delivery.

Signature software 114 receives information identifying the seller, the receiver, and the package from the delivery device as depicted in step 408. For example, delivery device 120 can transmit information that identifies package 302, wherein the transmitted data includes a tracking number, an order number, an invoice for the order, the merchant or seller, a time of purchase, the delivery company and/or an expected date for the delivery. In other example embodiments, signature software 114 can receive information that identifies two or more packages from delivery device 120. For example, signature software 114 can receive information from delivery device 120 relating to two or more expected packages. The received data can include information identifying the two or more expected packages such as a tracking number, an order number, an invoice for the order, the merchant or seller, an expected receiver, a time of purchase, the delivery company, an expected date for the delivery, and/or whether a signature is required.

In decision step 410, signature software 114 determines if a signature is required for the package. For example, upon receiving information for package 302 from delivery device 120, signature software 114 can retrieve the previously cached information for package 302 in persistent storage 108, wherein the previously cached information for package 302 can contain digital signature 116. If signature software 114 determines that a signature is required for package 302 ("Yes" branch, decision step 410), signature software 114 transmits the previously cached digital signature 116 with tag information identifying package 302 as depicted in step 412. For example, signature software 114 transmits digital signature 116 to delivery device 120, wherein digital signature 116 can include tag information, wherein the tag is utilized in determining that the package corresponds to the expected delivery, and wherein the information relating to the expected delivery includes a tracking number, an order number, a merchant or seller, a time of purchase, a delivery company, an expected date for delivery, an expected receiver, and/or whether a signature is required.

If signature software 114 determines that a signature is not required for package 302 ("No" branch, decision step 410), signature software 114 executes step 416. For example, upon retrieving the previously cached information for package 302 in persistent storage 108, signature software determines that a signature is not required to receive delivery for package 302.

In step 414, signature software 114 receives a confirmation for package 302 identified by the digital signature. For example, delivery device 120 and/or delivery software 132 transmit a notification that package 302 has been, or is ready to be delivered.

Signature software instructs the delivery service to leave package 302 at a location as depicted in step 416. For example, signature software 114 can instruct, or authorize, the delivery person to leave package 302 at a certain location to avoid unwanted attention of an unattended package in plain view. For example, signature software 114 can instruct the delivery person to leave package 302 in a bin located near the door to the residence.

In an alternate example embodiment, the user has a smart doorbell (not shown), with an instance of signature software 114, installed in a home. The user can store digital signature 116 in the smart doorbell using an app (e.g., an instance of signature software 114) on mobile device 102. Signature software 114 queries email, calendar, text messages for shipping confirmations and records tracking numbers, the shipper, the expected arrival date, and whether a signature is required upon delivery. For a package where signature is required, the signature software 114 caches digital signature 116, then tags digital signature 116 specifically for the shipper and package in route, and sends that data to the smart doorbell.

Upon detecting that a shipment/shipper arrives, the smart doorbell can determine carrier/shipment arrival by methods that could include: (i) identification through the smart doorbell's video feed, (ii) detecting that the doorbell button has been pressed, (iii) detecting a knock on the door, and/or (iv) detecting a signal that identifies the carrier and tracking number of the shipment being emitted by carrier's device. The smart doorbell then determines whether digital signature 116 should be broadcast or if the receiver of the package is available to sign for shipment. Determining if the receiver is available can include a proximity value that can be determined by the location of mobile device 102 associated with the intended recipient and if mobile device 102 is connected to the same WiFi network as the smart doorbell. For example, the receiver of the package can be attending a family event in the back yard of the residence. The smart doorbell can detect that mobile device is not connected to the same WiFi network as the smart doorbell, resulting in a low proximity value, and automatically transmit digital signature 116 to delivery device 120. Availability can also be determined by movement (e.g., mobile device 102 in the users pocket), or Bluetooth/lack of Bluetooth device connectivity to headphones, fitness trackers, etc. In a connected home, the smart doorbell could use data from the system (e.g., digital signature processing environment 100) to determine availability. In some embodiments, availability corresponds to whether the receiver (or another person) is present inside the receiver's home. Some examples of data that can be used to determine availability in these embodiments include: whether a security system is armed, whether one or more motion sensors, also referred to as one or more motion detectors, have detected movement inside the house, whether water is running, and/or whether any appliances are being used at that moment. In some embodiments, availability corresponds to the receiver's nearness to the door. In these embodiments, a receiver is considered to be not available, or unavailable, when the receiver's nearness (e.g., proximity value) to the door is such that the receiver would not be predicted to be able to move to the door within a predefined time period. For example, upon determining a delivery service has arrived with an expected package, the smart doorbell can determine that the receiver is unavailable using one or more smart home features that indicate a security system is currently armed, mobile device 102 is set to a "do not disturb" mode or powered off, and water is running in an upstairs bath tub. In another example, the smart doorbell can detect that the receiver is away from the home by locating mobile device 102 that indicates the receiver is traveling in a vehicle.

When the smart doorbell determines the user or receiver of the package is not available (e.g., the receiver of the package went upstairs to take a shower), digital signature 116 is automatically transmitted. In one example embodiment, the smart doorbell could wait a specified period of time for the receiver to answer the door before sending the digital signature 116, or send digital signature 116 immediately after confirming the package has arrived and the receiver is not available to sign. In another example embodiment, the user or receiver can override having the smart doorbell detect availability or nearness and immediately send digital signature 116 during a specified time period (e.g., between 2 pm and 3 pm while the user or receiver is away from the home) or for a certain length of time (e.g., for the next 20 minutes while the user or receiver is unable to answer the door).

The smart doorbell emits digital signature 116 stored for a specific package/tracking number and carrier via existing technologies, such as near-field communication (NFC), wireless, email, text also referred to as short message service (SMS), and Bluetooth. NFC is a set of communication protocols that enable two electronic devices, one of which is usually a portable device such as mobile device 102 and delivery device 120, to establish communication by bringing them within 4 cm (1.6 in) of each other. The shipper receives digital signature 116 and subsequently leaves the package.

In other example embodiments, in situations where the receiver is not home but is enroute to the home or travelling elsewhere (i.e., away from the home) when the delivery service arrives, cloud service (e.g., service 140) can automatically send digital signature 116 or notify the delivery person to not leave the package based on the receiver instructions relating to unavailability (e.g., when the receiver is away from home). In another example embodiment, where the receiver is traveling away from the home (delivery address), the receiver may not want to electronically sign for the package and hence prevent delivery. For example, while away from the home, the receiver can be notified by service 140 that a package has arrived. The receiver can then instruct service 140 to not send digital signature 116 to prevent the package from being left unattended for a length of time. Service 140 can then instruct the delivery service to not leave the package, or not stop at the residence. In another example embodiment, where a signature is not required however the receiver may want to signal, or instruct, the delivery person to not leave the package. The delivery person does not need to stop by the house for this to be determined. The cloud service (e.g., service 140) can automatically send this notification.

In a case where the receiver is in route to their home (delivery address) but will not reach the address before the delivery person, the receiver can send the electronic signature so the package will get delivered with a digital signature confirmation. In this scenario the electronic signature and indication if a package should or should not be delivered could be transmitted directly to a cloud based service, such as service 140, that is tracking the whereabouts of the receiver and the delivery person.

The delivery person is then notified via the cloud based service. Alternatively the receiver could send a message (directly or via cloud based service) to any other devices left in the home to emit digital signature 116. Or, the cloud service itself may emit digital signature 116 on behalf of the end user.

Embodiments of the present invention provide the ability to specify a time window within which a package may be signed and accepted by a receiver even though the receiver is not physically present to provide a signature. A user may want to be able to allow the package to be delivered during a particular time window, but not during others, when the user may not be available to provide the signature in order to accept the physical package. At other times, the user may not want to have the package delivered. The time window when a user may be able to allow for a package to be signed for is dynamic. For example, the receiver may be temporarily unavailable because the receiver is in the shower. The receiver's devices may have information about the whereabouts of the receiver; examples of such include the receiver being in the house but unavailable, or being on the way home and nearly there. A user may also know that the user or a trusted third party is almost at the delivery location to receive the package, but may not be able to make it in time to be present when the package arrives, etc. The receiver may want to have the package signed for and delivered even though the receiver is not present, but only during a certain time window.

FIG. 5 depicts a block diagram, generally designated 500, of components of the mobile device executing the signature software, in an embodiment in accordance with the present invention. It should be appreciated that FIG. 5 provides only an illustration of one implementation and does not imply any limitations with regard to the environments in which different embodiments may be implemented. Many modifications to the depicted environment may be made.

Mobile device 102 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Signature software 522 and digital signature 524 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of network 118, delivery device 120, and service 140. In these examples, communications unit 510 includes one or more network interface cards. Communications unit 510 may provide communications through the use of either or both physical and wireless communications links. Signature software 522 and digital signature 524 may be downloaded to persistent storage 508 through communications unit 510.

I/O interface(s) 512 allows for input and output of data with other devices that may be connected to mobile device 102. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., signature software 522 and digital signature 524, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" acting as a single "user."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

"Automatically" means "without any human intervention."

What is claimed is:

1. A computer-implemented method comprising:
storing, by one or more computer processors in a mobile device, a digital signature, wherein the digital signature is associated with information relating to an expected delivery at an expected location, wherein the digital signature includes a tag with information relating to the expected delivery, wherein the tag is utilized in determining that a package corresponds to the expected delivery, wherein the information relating to the expected delivery includes a tracking number, an order number, a merchant or seller, a time of purchase, a delivery company, and an expected date for delivery, and wherein the mobile device is located within a proximity of the expected location;

detecting, by one or more computer processors in the mobile device, that a delivery service has arrived at the expected location with the package, wherein detecting that a delivery service has arrived at the expected location with a package includes:
  detecting a sound emitted by a doorbell or a knocking sound on a door,
  receiving an indication from a smart doorbell that a delivery service has arrived with the package,
  receiving an input from a security camera, and
  receiving a transmission from a delivery device relating to the package; and in response to determining, by one or more processors in the mobile device, that the package corresponds to the expected delivery, authorizing, by one or more processors in the mobile device, the package to be left at the expected location by transmitting the digital signature to a delivery device associated with the delivery service, wherein the transmitting of the digital signature to the delivery device is performed using near-field communication (NFC), and wherein the authorizing is further in response to detecting that an intended recipient of the expected delivery is unavailable to answer the door to sign for the package;

wherein detecting that the intended recipient of the expected delivery is unavailable to answer the door to sign for the package comprises:
  determining a proximity value of the intended recipient in relation to the expected location, wherein the proximity value is determined based a location of the mobile device and whether the mobile device is connected to a same network as a smart doorbell installed at the expected location,
  determining whether a security system is armed,
  determining whether any movements are detected inside a home by one or more motion detectors or one or more security cameras,
  determining whether water is running inside the home, and
  determining whether any appliances inside the home are being used.

* * * * *